J. A. VAHEY.
METHOD OF AND APPARATUS FOR TESTING CONDUCTORS FOR FAULTS.
APPLICATION FILED APR. 28, 1915.
1,210,566.  Patented Jan. 2, 1917.
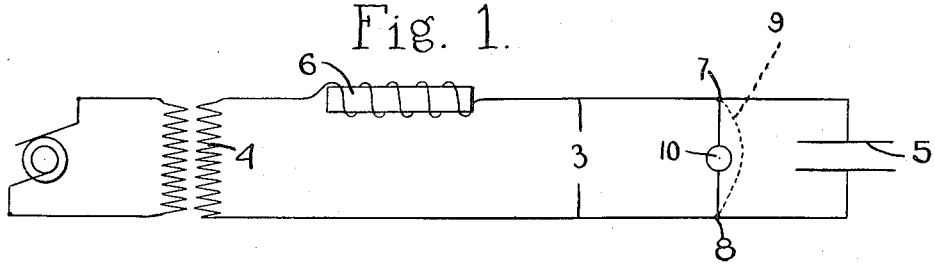
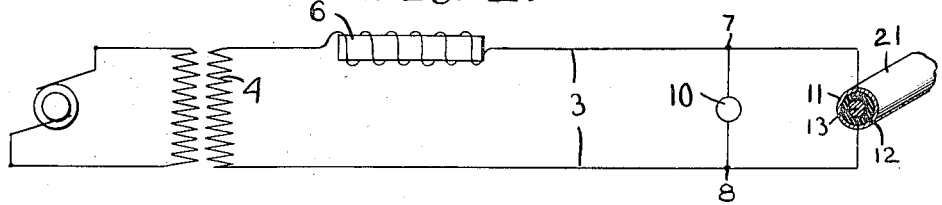
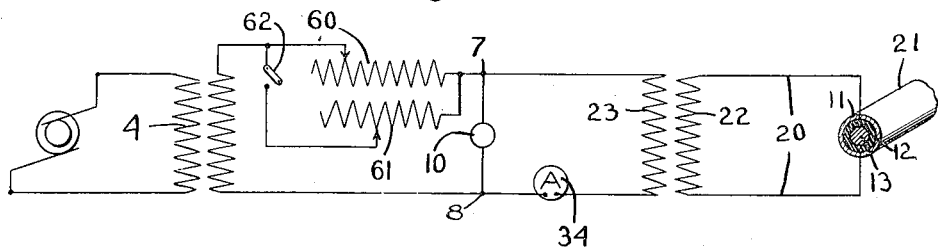
Inventor
James A. Vahey
by Heard Smith Tennant
Att'ys

UNITED STATES PATENT OFFICE.

JAMES A. VAHEY, OF BOSTON, MASSACHUSETTS.

METHOD OF AND APPARATUS FOR TESTING CONDUCTORS FOR FAULTS.

1,210,566.  Specification of Letters Patent.  Patented Jan. 2, 1917.

Application filed April 28, 1915. Serial No. 24,393.

*To all whom it may concern:*

Be it known that I, JAMES A. VAHEY, a citizen of the United States, residing at Boston, county of Suffolk, State of Massachusetts, have invented an Improvement in Methods of and Apparatus for Testing Conductors for Faults, of which the following description, in connection with the accompanying drawing, is a specification, like characters on the drawing representing like parts.

This invention relates to a method of and apparatus for testing a conductor to ascertain whether or not it has a fault therein, and for analyzing the fault if one is found to exist.

In carrying out my invention I impress on the conductor to be tested an alternating voltage which will result in a current flow whether the conductor be a faulty or a healthy conductor. If the conductor is a healthy conductor, this current flow is entirely in the nature of a charging current, while if the conductor is a faulty conductor, some or all of the current flow will be in the nature of a fault current. I make use of this fact by providing means whereby when an alternating voltage is thus impressed upon a conductor the charging current can be discriminated from the fault current, and thus a determination can be made as to whether or not a fault exists.

My invention also provides means for analyzing the fault, if one is found to exist, and determining its characteristics.

In the drawings, Figure 1 is a diagrammatic view illustrating the principle on which my invention operates; Fig. 2 is a diagrammatic view showing this principle applied in testing a cable; Fig. 3 is a diagrammatic view illustrating an apparatus by which my method of testing may be carried out.

It is a well known fact that the presence of condensance in a circuit carrying alternating current tends to make the current lead the voltage, while the presence of inductance in said circuit tends to make the current lag behind the voltage. When, therefore, a circuit carrying alternating current has both condensance and inductance therein in series, the pressure of voltage across the condensance will not be in time phase with the pressure or voltage across the inductance. This is illustrated in Fig. 1, wherein 3 designates a circuit carrying alternating current supplied from a transformer 4 or other source of supply and having both condensance 5 and inductance 6 therein arranged in series. With a construction of this sort, the pressure across the condensance between the points 7 and 8 will always be at least equal to and generally greater than the voltage impressed on the circuit. If, however, these points 7 and 8 are connected by a short circuit 9 of more or less resistance the pressure between these points due to the presence of the condensance 5 and inductance 6 will be reduced somewhat, depending upon the resistance of the connection 9. If, therefore, a suitable voltage indicator, such as a lamp 10, is placed across the points 7 and 8, then without the presence of the short circuit 9, the lamp or other indicator will receive the voltage due to the presence of the condensance 5 and inductance 6, but if a short circuit 9 is placed across these points the voltage received by the lamp or other indicator will be reduced, depending upon the resistance of the circuit 9. The foregoing phenomena are due to the presence of both the condensance 5 and of inductance 6 in series in the circuit 3. In making use of these phenomena in testing a conductor, I provide an apparatus which includes a testing circuit and also an equivalent of the inductance 6, and I connect this circuit to the cable to be tested. If the cable is one of ordinary construction involving an insulated inner core covered by a metal sheath, I connect the two sides of the testing circuit to the core and sheath, respectively, in which case the cable itself constitutes the necessary condensance in the testing circuit. A suitable voltage indicator, such as a lamp, is then placed across the two sides of the testing circuit connected to the cable and an alternating voltage is impressed on the circuit. This alternating voltage will result in current flow and if the cable is intact this current constitutes a charging current only, but if the cable is faulty, then some or all of the current will be a leakage or fault current. If the cable is intact then the full effect of the condensance represented by the cable is felt in the line and the lamp will receive the full voltage due to the presence of both the condensance and inductance, and will thus burn brightly. If, however, the cable has a fault therein, then some of the current resulting from the impressed alternating voltage will be fault or leakage current which will pass from the core to the sheath through the fault or leak. This is similar to the placing of a short circuit 9 in the circuit, and the result of this is that the voltage impressed on the lamp will be reduced more or less depending upon the amount of current which passes through the short circuit or fault. The lamp will, therefore, burn more or less dimly, and by this means the fault current can be discriminated from the charging current.

In Fig. 2 I have illustrated diagrammatically the application of the above principle to the testing of a cable involving an insulated inner core or conductor 13 inclosed in a sheath, said core or conductor being surrounded by insulation 12. If a circuit 3 is connected to this cable with one side of the circuit electrically connected to the core 13 and the other side to the sheath 11, as shown in Fig. 2, and a suitable inductance 6 is placed in the circuit, as shown, then if alternating voltage is impressed on the circuit this will produce a current which will be a charging current only if the cable is intact and faultless, but will be partially a charging current and partially a leakage current if the cable is faulty in any particular. In Fig. 2 the cable is the equivalent of the condensance 5 shown in Fig. 1. If a lamp 10 is placed across the circuit 3 between the cable and the inductance, this lamp will burn brightly if the cable is intact because it will receive the full voltage resulting from both the presence of the inductance 6 and of the condensance 5 provided by the conductor. If, however, the cable has a fault therein, then some of the current resulting from the impressed alternating voltage will be a fault or leakage current which will pass from the core 13 to the sheath 11 through the fault, and the existence of such fault or leakage current will cause the lamp 10 to burn less brightly. If the conductor to be tested is an overhead conductor, then one side of the circuit 3 will be connected to the conductor and the other side to the ground, the insulation of the conductor, if any, and the surrounding atmosphere constituting the equivalent of the condensance in Fig. 1. If the conductor is intact the lamp connected across the circuit 3 will burn brightly, but if the conductor is faulty, the lamp will burn dimly, as above described, thus indicating the faulty condition.

In the practical use of the invention the alternating voltage will be impressed on the circuit 3 before the latter is connected to the cable 21. As soon as the alternating voltage is thus impressed on the circuit 3 the lamp 10 will be lighted and will burn with a certain brilliancy which will be normal for the current conditions existing in the circuit 3. The circuit 3 is then plugged into or connected to the cable 21, as shown in Fig. 2, and when this occurs, the lamp will either burn with greater or less brilliancy, depending on whether the cable is healthy or faulty. If the cable is healthy the introduction into the circuit 3 of the condensance due to the cable will cause the brilliancy of the lamp to increase. On the other hand, if the cable is faulty the condensance in the circuit is reduced by the fault and the lamp, therefore, burns dimly. Therefore, if when the cable is plunged into the circuit 3 the lamp burns at or above its normal brilliancy, this fact indicates that there is no leakage or fault in the cable or conductor. On the other hand, if when the cable is plugged into the circuit 3 the brilliancy of the lamp decreases, this fact indicates that there is a fault or leakage.

In Fig. 3 I have illustrated a slightly different arrangement in which the testing circuit is inductively connected to the cable or conductor to be tested through a transformer. The advantage of this construction is that a transformer can be used having such characteristics as to secure a voltage of any desired amount in the conductor circuit to be tested. In Fig. 3, 3 designates the supply circuit which has a variable inductance 60 therein. The conductor circuit to be tested, which is herein illustrated as the core 13 and sheath 11 of a cable 21, is connected by the leads 20 to one coil 22 of a transformer, the other coil 23, constituting the low voltage side of the transformer, being in the circuit 3 in series with the variable inductance 60. In this embodiment of the invention the lamp 10 is placed across the circuit 3. The operation of the device shown in Fig. 3 is the same as that shown in Figs. 1 and 2, for so long as the circuit to be tested or the cable 21 is intact or faultless, the lamp 10 will burn with its maximum brilliancy, while if the circuit to be tested has a fault therein the lamp 10 will burn more or less dimly, depending on the character of the fault.

The principal difference between the construction shown in Fig. 2 and that shown in Fig. 3 is that in one diagram the supply circuit 3 is shown as connected directly to the conductor, while in Fig. 3, the supply circuit is inductively connected to the conductor. In both embodiments of my invention, however, the supply circuit is connected to the conductor so that alternating voltage impressed on the supply circuit will produce a current in the conductor. The sheath 11 in Figs. 2 and 3, or the ground when the device is used for testing an overhead conductor, as above described, may be considered as conducting elements and, therefore, when in use the testing circuit 3 is connected either directly or inductively to two conducting elements separated by a dielectric, which in the case of the cable is the insulation 12 between the core and the sheath, and in the case of the overhead conductor is the insulation on the conductor, if there is any, and the surrounding atmosphere.

Taken in its broadest aspect my invention is a device for testing the condition of a dielectric separating two conducting elements, and it comprises a supply circuit connected either directly or indirectly to said conducting elements, an inductance in said circuit, means to impress on said supply circuit an alternating voltage which results in current flow in the conductors, and means to indicate whether said current is a charging current only, a fault or leakage current only, or partially a charging current and partially a fault or leakage current, and if both charging and fault or leakage currents exist the relation between said currents. This indicating means has been herein illustrated and described as a lamp 10, but it will be obvious that any suitable device capable of indicating the voltage across the supply circuit between the inductance and the conducting elements may be employed without departing from the invention, and, therefore, I do not wish to be limited to the use of a lamp for this purpose. A lamp is a convenient indicator, however, because variations in the brilliancy with which it burns are easily observed, thus making the device one which can be easily read.

The construction shown in Fig. 3 has the further advantage that the transformer 22, 23 when used in connection with a variable inductance 60 provides means for varying within wide limits the current and voltage impressed on the conducting elements, thus providing means for obtaining a better analysis of the fault.

I have above described how my invention may be used for testing a cable or conductor to determine whether it is faulty or healthy. My invention is also capable of being used to analyze the fault if one is found to exist thereby to give an indication as to the characteristics of the fault. For instance, in an overhead line there is always more or less leakage in a healthy conductor. Therefore, if my invention as above described should be used to test an overhead line the presence of the leakage would be indicated by the dimming of the lamp. My invention is capable of being used to determine whether this leakage is due to a fault, or whether it is the natural leakage to which an overhead line is subjected. I am able to determine this fact by introducing into the circuit 3 added inductance in parallel as indicated by the variable inductance 61 which may be connected in parallel with the inductance 60 by means of a switch 62. If when an overhead conductor is being tested it is found that the lamp 10 is dim, thus indicating either a leakage or fault current, and the lamp 10 burns more brightly when added inductance 61 is introduced in the circuit 3 in parallel, this fact indicates leakage only in the overhead line, and the absence of a fault. The reason for this is because the added or increased inductance in parallel allows more current to flow in the circuit 3, and as the leakage in the overhead line is practically constant at any given pressure the introduction of a greater current in the testing circuit will increase the brilliancy of the lamp. If when the added inductance is introduced in the circuit 3 in parallel the lamp 10 still continues to burn dim and does not brighten, this will indicate that the conductor is faulty.

An arcing fault is indicated by a marked increase in the brilliancy of the lamp during the formation of the arc. In other words, the lamp will flicker in unison with the arc. If the arcing should occur under water the fluctuations will be regular, while if the arcing occurs in oil or in an insulating medium, the fluctuations will be irregular, and by this means the character of an arcing fault can be ascertained. It is possible with my invention to determine the relative values of the charging and fault currents if a fault exists thereby to determine whether the fault is a high resistance or low resistance fault. This can be done by placing an ammeter in the circuit 3 as indicated at 34, and before the circuit is connected to the cable adjusting the inductance so as to get a certain predetermined reading on the ammeter when the cable is short-circuited. The circuit is then connected to the cable, and if the ammeter shows an increased reading and the lamp burns brightly this indicates that the cable is healthy. If, however, the lamp burns dimly, this fact shows the presence of both a leakage or fault current and a charging current, and the relative proportions of these two currents is shown by the amount of increase in the reading of the ammeter.

My invention is also capable of use in determining whether or not a so-called "open" exists in a series street lighting circuit, and if it does exist its approximate location. If my device is connected to a street lighting circuit which is open, the lamp 10 will burn with increased brilliancy due to the fact that the open circuit introduces condensance into the testing circuit. If the street lighting circuit is closed or in its normal condition the lamp will burn with less than normal brilliancy due to the absence of the condensance. If the street lighting circuit is found to be open the position of the break or "open" can be determined by testing each side of the circuit to the open separately. The lamp will burn brightest when connected to the longest side to the fault or open because this side will have a greater condensance therein.

There are various other ways in which my invention may be used in analyzing a fault.

While I have illustrated herein some embodiments of my invention, I do not wish to be limited to the constructional features shown.

I claim:

1. In a device of the class described, the combination with a conductor, of a circuit connected thereto, an inductance in said circuit in series with the conductor, means to impress an alternating voltage on said circuit, and means to indicate the relation between the resulting charging and fault or leakage currents developed in said circuit thereby to determine the presence or absence of a fault in said conductor.

2. In a device of the class described, the combination with a cable having an insulated core and a sheath, of a circuit having one side connected to said core and the other to said sheath, an inductance in said circuit in series with said cable, means to impress an alternating voltage on said circuit, and a lamp connected to opposite sides of said circuit across the cable, the brilliancy of which determines the presence or absence of a fault.

3. The method of testing a conductor for faults or leakage which comprises connecting to said conductor a testing circuit having inductance therein, impressing an alternating voltage on said circuit by which a current is developed that is either a charging current or a fault or leakage current or both, depending on whether the conductor is faulty or intact, and placing a voltage indicator across said circuit between the conductor and inductance whereby the relation between the charging and fault currents can be ascertained by the indication of the voltage indicator.

4. In a device for testing for faults in a dielectric separating two conducting elements, the combination with a circuit connected either directly or inductively to said elements, an inductance in said circuit, means to impress an alternating voltage on said circuit, and means to indicate the relation between the resulting charging and fault or leakage currents developed in said conducting elements thereby to determine the presence or absence of a fault in said dielectric.

In testimony whereof I have signed my name to this specification.

JAMES A. VAHEY.